United States Patent [19]

Ikeuchi et al.

[11] Patent Number: 4,622,228

[45] Date of Patent: Nov. 11, 1986

[54] PROCESS AND APPARATUS FOR PRODUCING FOOD PRODUCT

[75] Inventors: Hiroji Ikeuchi; Kiyoaki Ikeuchi, both of Akashi, Japan

[73] Assignee: Kabushiki Kaisha Ikeuchi Tekkosho, Akashi, Japan

[21] Appl. No.: 769,175

[22] Filed: Aug. 26, 1985

[51] Int. Cl.[4] .......................... A23L 3/22; A23L 1/27; A23P 1/00

[52] U.S. Cl. ...................................... 426/241; 99/427; 99/441; 219/10.55 A; 426/250; 426/517; 426/520

[58] Field of Search ............... 426/241, 517, 520, 243, 426/250; 219/10.55 A; 99/384, 427, 441

[56] References Cited

U.S. PATENT DOCUMENTS 3,421,434 1/1969 Krachmer .......................... 426/513
4,448,793 5/1984 Akesson .............................. 426/241

Primary Examiner—George Yeung
Attorney, Agent, or Firm—Marshall, O'Toole, Gerstein, Murray & Bicknell

[57] ABSTRACT

A process and apparatus are disclosed for making an elongated food product. An elongated length of solidified food product is placed on and conveyed by an endless flat belt and fed into a tube after the belt is shaped into a cyclinder and encloses the food product. The elongated food product is then heated by a microwave oven while it is in the tube.

8 Claims, 9 Drawing Figures

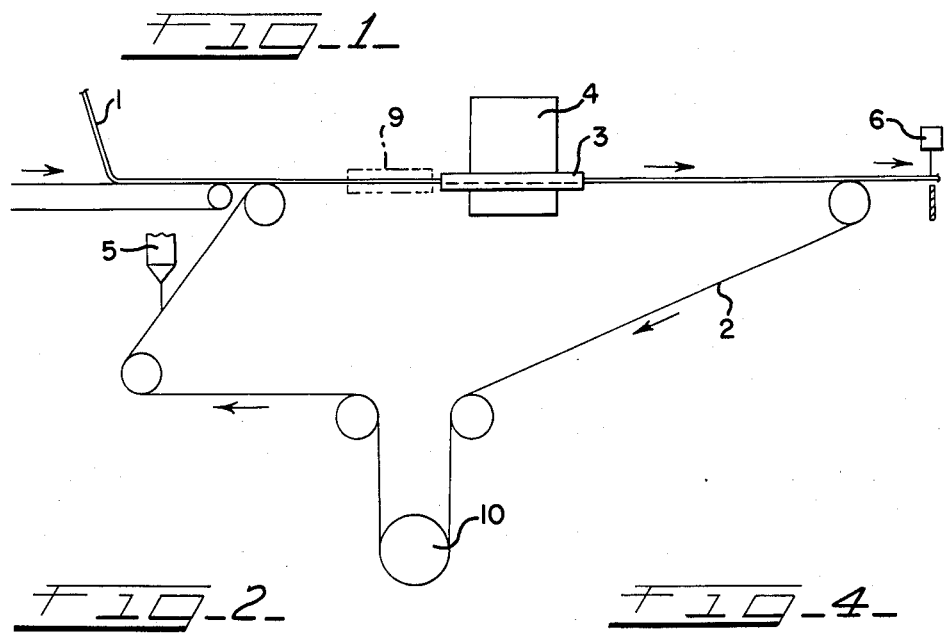
Fig. 1
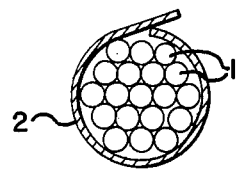
Fig. 2
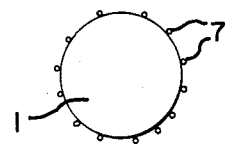
Fig. 4
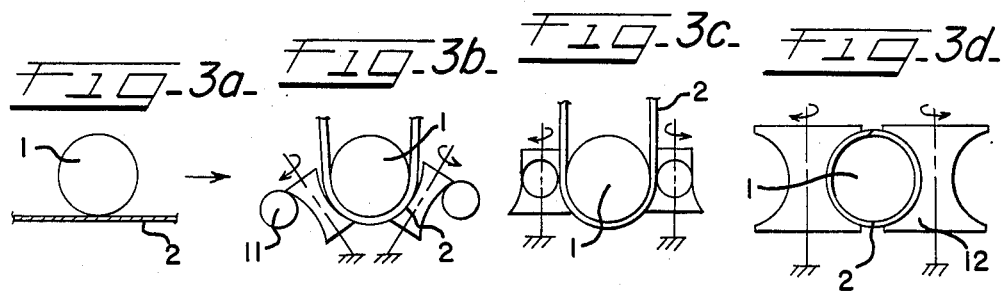
Fig. 3a  Fig. 3b  Fig. 3c  Fig. 3d
Fig. 5
Fig. 6
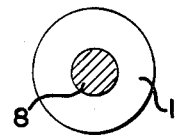

PROCESS AND APPARATUS FOR PRODUCING FOOD PRODUCT

FIELD AND BACKGROUND OF THE INVENTION

The present invention relates to a process and to an apparatus for producing a stick-like food product.

A stick-like food product, particularly one such as a paste stick product including a crableg-like meat (uncolored), for example, has been conventionally produced by coloring the peripheral surface of the paste stick product, produced by the usual process, with a crab-like reddish food pigment. The coloring is usually applied by enveloping the paste stick product in a polyethylene film which has its inner surface coated with a reddish food pigment. The pigment is then transferred to the food by boiling in hot water or by steaming.

However, when using the above conventional process, it is difficult to satisfactorily transfer the reddish food pigment to the surface of the paste stick food product, because the transfer depends on the boiling condition of the hot water or the steaming. Further, because it is indispensable that the stick be enveloped by the polyethylene film, the process is complicated.

The present invention avoids the foregoing problems and provides a process and apparatus for making a stick-like food product, such as a crableg-like paste stick product, which are capable of transferring a coating such as a food pigment onto the surface of the food product without fail and satisfactorily.

SUMMARY OF THE INVENTION

A process for making a stick food product according to this invention is distinguished in that a food product is continuously placed on and conveyed by an endless flat belt and fed into a tube after the belt is shaped into a cylinder and encloses the food product, and then the product is heated by a microwave oven around the tube. The coating is placed on the belt prior to the food product.

An apparatus for making the food product, according to this invention, includes an endless flat belt for continuously conveying an elongated food product, forming means for forming the belt into a cylinder which encloses the product, a tube which receives the product and the cylindrically formed belt, and a microwave heating means for heating the food product in the tube.

BRIEF DESCRIPTION OF THE DRAWINGS

The invention will be better understood from the following detailed description of a preferred embodiment of the apparatus used in the process for producing the paste product, taken in conjunction with the drawing in which:

FIG. 1 is a general diagrammatic view of apparatus for executing a process according to the present invention;

FIG. 2 is a cross sectional view showing a formed state of a paste stick product being enveloped by an endless Teflon belt during the process;

FIGS. 3a through 3d are views showing a series of steps during forming and treating a paste product by enveloping the product with an endless belt; and FIGS. 4 through 6 are cross sectional views showing various products produced according to this present invention.

DETAILED DESCRIPTION OF THE DRAWINGS (a) Firstly, a paste food product 1 is formed into an elongated flat or string-shape, in a conventional manner, by being heated, shaped and solidified, and is then placed on the upper level of and conveyed by an endless belt 2 which circles in the clockwise direction as shown by the arrows in FIG. 1. It is preferred that the belt be made of Teflon.

(b) Secondly, the endless belt 2 is formed to the shape of a cylinder so as to enclose or envelop the paste food product (see the cross-sectional view of FIG. 2).

(c) Then, the endless belt 2, cylindrically formed and enveloping the paste product, is inserted in and passed through a tube 3 which is preferably made of Teflon.

(d) Simultaneously, a microwave oven heating apparatus 4 is energized and the food product 1, which is inside the formed part of the belt 2, is heated and provided with the necessary quantity of heat for processing, while the endless belt 2 and the product are passing through the tube 3.

(e) After passing through the tube 3, the formed part of the endless belt 2 is returned to the original flat state and the same operation is repeated.

(f) The cylindrically shaped paste product 1, heated by the microwave oven, is cut with a cutter 6 into suitable lengths and removed from the upper level of the belt 2 for packaging.

In addition, if a coating of a food pigment, seasoning or the like is required, it is coated on the surface of the endless belt 2 before the product 1 is placed on the belt. The coating is placed on the belt 2 by a coater 5 which is located upstream of the location where the product 1 is placed on the belt. Thus the product 1 is placed on the coated belt and the coating is transferred to the surface of the product 1.

The shape of the product 1 may be that of a continuous belt or string. In the example of a crableg-like meat paste product, the microwave heating oven 4 is adjusted and the moving speed of the endless belt 2 is set in advance so that the product 1 is heated by the radiation of the microwave oven for approximately 5 seconds to bring the core temperature of the paste product to the range of approximately 60° to 70° C. The coating may be a reddish food pigment.

The numeral 9 denotes an apparatus for forming the belt 2 and may, for example, be a series of forming devices as shown in FIGS. 3a through 3d. The numeral 11 denotes rollers and the numeral 12 designates concave forming jigs, a pair of which are provided at each step shown in each b, c and d. (The forming tratment is performed in the sequence shown in FIG. 3a to b to c to d.) However, the forming apparatus is not limited to the arrangement shown, and other means which are capable of forming a cylindrical shape of the belt may be used.

A variety of food products may be processed as described, in addition to the crableg meat discussed above.

A product as shown in FIG. 4 (which is a cross sectional view) can be produced by adding seasoning material 7 at approximately the location of the coater 5 shown in FIG. 1. The material 7 may, for example, be sesame seeds or green laver pieces placed on the endless belt 2 before the food product 1 is placed thereon.

A product as shown in FIG. 5 (which is a cross sectional view) can be produced by forming the endless belt into a cylinder after placing first a flat ribbon-shaped paste product 1 on the belt 2 and then laying a stick material 8 such as burdock or cheese on the flat paste product 1. Thereafter the belt 2 and the food are shaped to a cylinder as described.

A product as shown in FIG. 6 (which is also a cross sectional view) can be produced by first providing the endless belt 2 with a surface coating of a reddish (for example) food pigment 13, and then placing a number of string-shaped paste products 1 on the belt, and processing them in the described manner.

According to the present invention as described above, the following advantages are obtained.

(1) A paste stick food product may be produced continuously and efficiently without a casing.

(2) Since solidifying and forming means do not require boiling in hot water or steam after being enveloped with a polyethylene film, as in the prior art, a saving of materials and process steps may be attained.

(3) Furthermore, since the coloring or pigment of the paste stick product is applied by enveloping the product with the endless belt having the coating thereon, and since a Teflon belt has particularly good releasing or stick-free properties, the food pigment tends to be transferred well to the surface of the paste stick product.

Thus, according to the present invention, since not only forming or solidifying the paste stick product but also transferring the food pigment onto the paste stick product can be performed continuously, and the prior art boiling in hot water or steam is not required, the processing space can be reduced effectively. It is preferred that the heating apparatus be a microwave oven in order to reduce the cooking time, and the belt 2 and the tube 3 should, of course, be made of microwavable materials that can be penetrated by microwaves.

What is claimed is:

1. A method of producing an elongated food product comprising the steps of heating, shaping and solidifying a paste food product to form an elongated length of solidified food product, placing the elongated length of solidified food product on a generally flat moving belt, forming a portion of said belt into a cylinder by a plurality of sets of rollers so as to envelop said elongated food product, moving said portion of said belt and said elongated food product therein into a tube, heating said elongated food product while it is in said tube, and then removing said elongated food product from said tube and said belt.

2. The method of claim 1, wherein said belt and said tube are made of Teflon.

3. The method of claim 1, wherein said product is heated in a microwave oven.

4. The method of claim 1, and further including the step of coating said belt before placing said food product on said belt.

5. Apparatus for making an elongated food product, comprising a generally flat belt for conveying an elongated food product, forming means for forming a portion of said belt into a cylinder which substantially encloses said food product, said forming means comprising a plurality of sets of rollers, said sets being spaced along the length of said belt, each of said sets of rollers engaging the sides of said belt and successive sets being shaped to fold said belt around said food product, a tube, said portion of said belt and said food product being movable into said tube, and heating apparatus for heating said food product in said tube and said portion of said belt.

6. Apparatus according to claim 5, wherein said belt and said tube are made of Teflon, and said heating apparatus is a microwave oven.

7. Apparatus according to claim 5, and further including means for placing a seasoning on said belt.

8. Apparatus according to claim 5, and further including menas for coating said belt with a food coloring material.

* * * * *